Dec. 14, 1954 E. S. EWART ET AL 2,696,863
TIRE TREAD

Filed June 20, 1951 2 Sheets-Sheet 1

INVENTOR.
ELLIOTT S. EWART
BY AUDREY H. STEADMAN
Charles C. Willson
ATTORNEY.

Dec. 14, 1954     E. S. EWART ET AL     2,696,863
TIRE TREAD
Filed June 20, 1951     2 Sheets-Sheet 2

INVENTOR.
ELLIOTT S. EWART
BY AUDREY H. STEADMAN
Charles C. Willson
ATTORNEY.

United States Patent Office 2,696,863
Patented Dec. 14, 1954

2,696,863

TIRE TREAD

Elliott S. Ewart, St. Clair Shores, and Audrey H. Steadman, Detroit, Mich., assignors to United States Rubber Company, New York, N. Y., a corporation of New Jersey Application June 20, 1951, Serial No. 232,633

2 Claims. (Cl. 152—209)

This invention relates to tires, and more particularly it relates to the construction of the tread portions of pneumatic vehicle tires.

Heretofore many attempts have been made to design and construct the treads of pneumatic tires to improve their skid resistant properties while preserving the tread wearing qualities and stability of the tire and without sacrificing its soft riding and appearance characteristics. In many instances, improvements in skid resistance have been attained but at the expense of other features desirable, if not necessary, in a commercially acceptable passenger vehicle tire.

An object of this invention is to provide an improved tire tread that is highly resistant to both forward and lateral skids while embodying the optimum in stability, wear resistance, beauty and cushioned riding quality.

Another object of this invention is to provide a tire having a tread presenting a greater face area for road engagement resulting in longer tread wear and superior traction properties.

A further object of this invention is to provide a tire tread having functionally continuous, circumferentially extending, undercut ribs forming relatively deep constricted grooves therebetween which function to provide a flexible cushion effect enhancing the riding qualities while maintaining the stability of the tire.

A further object of the invention is to provide a tire having a tread structure comprising circumferentially extending undercut ribs, provided with circumferentially extending slits in the central area of the rib tread surfaces forming laminations, flanked on both sides by cross-slots extending inwardly from the marginal edges of each rib, all of which combine functionally to provide quicker gripping action, greater road contact area, and higher resistance to both forward and lateral skids.

A further object of the invention is to provide a tire tread formed with undercut ribs and constricted grooves providing increased tread unit flexibility and a softer ride, said ribs being designed and adapted to buttress one another under severe lateral skid conditions assuring good tire stability.

A still further object of the invention is to provide a tire having a tread structure including flask-shaped or constricted grooves having relatively wide bases and narrow face openings which minimize groove cracking and inhibit stone pickup.

A further object of the invention is to provide a tire having a tread structure including circumferential ribs undercut to provide overhanging edge portions and relatively closely spaced cross-slots in said edge portions forming units of small base length which during tire operation provoke a lower volume of noise and provide quieter tire performance.

The above and other objects, advantages, and novel features of this invention will be made more apparent as this description proceeds, especially when considered in connection with the accompanying drawings, wherein.

Figure 1:
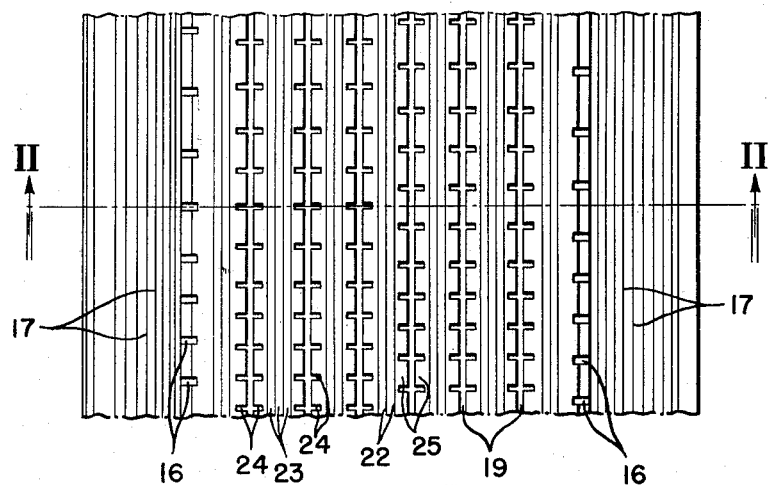
Fig. 1 is a plan view of a portion of a pneumatic tire illustrating an embodiment of this invention.
Figure 2:
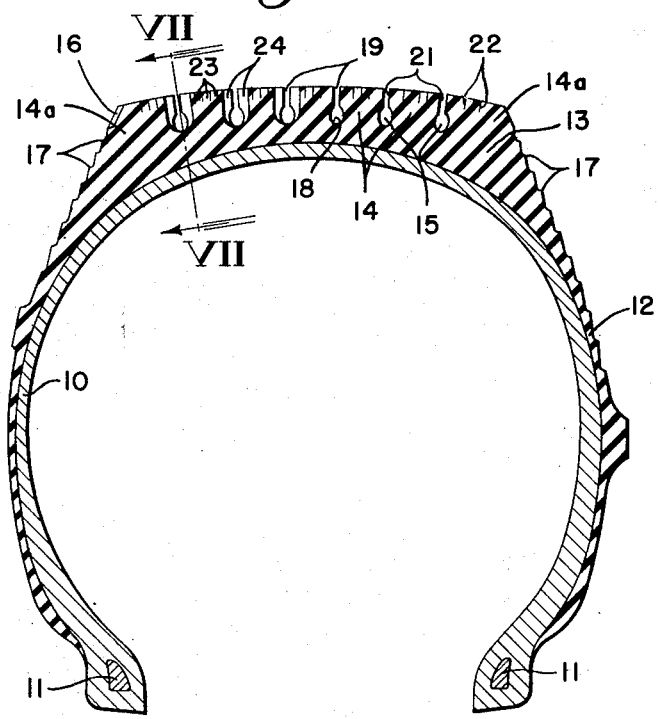
Fig. 2 is a transverse sectional view taken substantially on the plane indicated by line 2—2 in Fig. 1.
Figure 3:
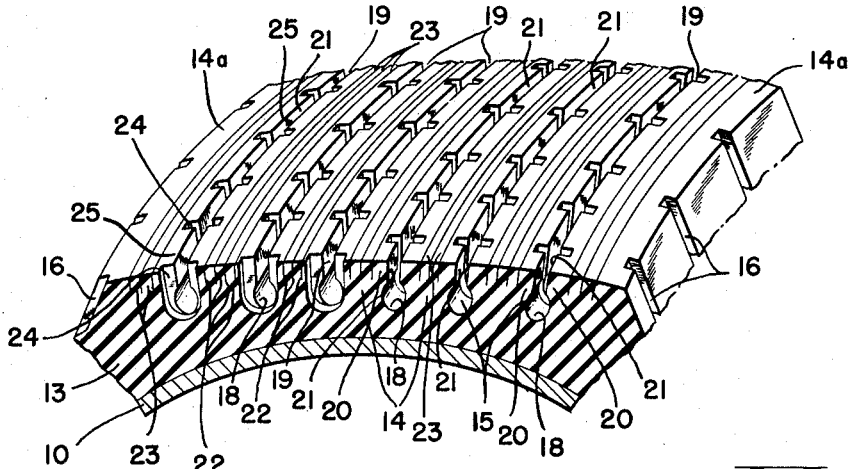
Fig. 3 is a fragmentary perspective view of a portion of the tire tread.

Referring to the drawings and more particularly to Figs. 1 to 3, there is shown a pneumatic tire comprising the usual carcass 10 having inextensible bead elements 11, sidewalls 12 and a tread portion 13 formed of rubber or rubber-like material. As shown, the tread is divided into a plurality of functionally continuous circumferentially extending ribs 14 separated by relatively deep grooves 15. The outermost ribs 14a of the tread are buttressed by respective rubber structures extending to the sidewalls of the tire, and said structures may be formed with suitable grooves 16 and ribs 17 arranged to form an ornamental or distinctive design.

As shown, the grooves 15 are relatively deep and of substantial width at their bases. Each groove is substantially flask-shaped in cross section having a relatively wide base portion 18 and a narrow or constricted face opening 19 at the tread face area. To provide grooves of this character, the ribs 14 are undercut as shown to provide substantially continuous overhanging edge or side portions 20 forming abutments, the faces 21 of which are adapted to abut so that the ribs will buttress one another under severe lateral skid conditions as will be more fully explained hereinafter.

Each of the ribs 14 as well as outermost ribs 14a are provided with a plurality of circumferentially extending, relatively shallow and closely spaced slits 22 forming thin or narrow laminations 23. The slits 22 are made without removing any rubber from the tire and without materially changing the appearance of the tread surface in the slitted area. The number of slits 22 in each rib may be varied, preference being given, however, to the arrangement illustrated in which the two ribs 14 adjacent the outermost ribs 14a are provided with four slits, whereas the remainder of the ribs are provided with three slits each.

The width and height of the laminations 23 are important because their purpose is to increase the softness and flexibility of the tire surface in the vicinity of such surface so as to provide a flexible cushion effect enhancing the riding qualities of the tire and to cooperate, in a manner yet to be described, in resisting lateral skids. The slits 22 are cut to about ⅓ the anti-skid depth of the tread and are spaced approximately ¹⁄₁₆" apart.

In order to further improve the traction properties and increase the skid resistance of the tread, each rib 14 is provided with a plurality of relatively closely spaced cross slots 24 extending inwardly from the marginal edges thereof toward the central rib area occupied by the laminations 23. The inner edges of the outermost ribs 14a are also provided with similar cross slots. These cross slots 24 are located in the overhanging edge portions 20 of the ribs 14 and 14a and the slots 24 in adjacent rib surfaces are opposed to one another. These cross slots 24 are spaced to form or define segments or units 25 of small base length. The base length of the units 25 is important and if, as illustrated, a base pitch of substantially .4 inch is employed, the shortest unit would be substantially .3 inch and the largest substantially .5 inch. This relatively close spacing of the cross slots 24 reduces the circumferential compression wave of each unit 25 and when the compression strains are released at the slot edges 24, during rotation of the tire in use, the resulting snapping action produces a lower noise volume than when longer base units 25 are employed. This results in quieter tire performance.

As shown in Figs. 2 and 3, the cross slots 24 in the opposed faces of adjacent ribs are arranged opposite one another in pairs and their radially inner ends merge into the large base portions 18 of the grooves 15. These slots are usually arranged in groups irregularly spaced around the circumference of the tire to break up the pitch noise. The depth of the cross slots transversely of the tire tread is substantially equal to the thickness of the overhanging edge portions 20 of the ribs 14 and 14a. Thus, the units 25, previously referred to, may act individually and in co-operation with adjacent units to prevent or reduce forward skid of the tire. Also, the faces 21 of the units 25 of adjacent ribs are adapted to buttress one another under severe lateral skid conditions to insure tire stability of a high order.

Figure 4:
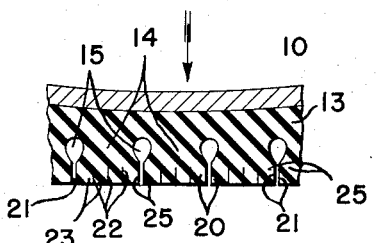
Fig. 4 is a fragmentary transverse sectional view through the tire tread as it appears under load conditions.

Under normal road and load conditions, disregarding skid forces, the tread will perform in the area of road engagement substantially as illustrated in Fig. 4. If unusual loads or lateral forces are encountered the faces 21 of the overhanging portions 20 of the units 25 will abut with the result that the anti-skid elements of the tread are supported or buttressed by one another to insure good tire stability. This construction permits the use of anti-skid elements of greater height with a correspondingly substantial increase in tread wear without impairing the stability of the tire.

Figure 5:
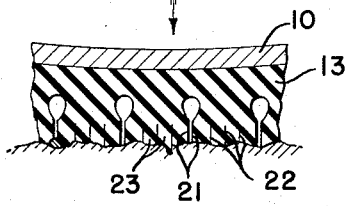
Fig. 5 is a view similar to Fig. 4 showing the tire tread as it appears under load when engaging road irregularities.

If the road surface is rough or uneven and other conditions are the same, the tread surface will perform in a manner substantially as illustrated in Fig. 5. The flexibility imparted to the tread by reason of the slits 22 and laminations 23 permits the tread to adapt itself to uneven road conditions and to produce a gripping action resulting in higher traction properties.

Figure 6:
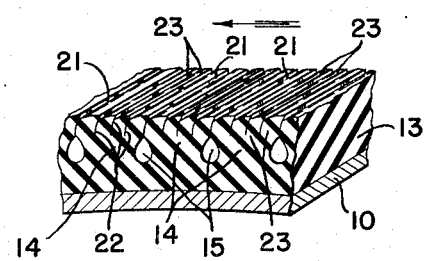
Fig. 6 is a fragmentary transverse sectional perspective view of a portion of the tire tread as it appears under lateral skid conditions.

In Fig. 6 the action of the tread is illustrated as it functions under lateral skid conditions. In this illustration it is assumed that the skid is in the direcon of the arrow. The undercut tread ribs 14 being relatively laterally flexible tend to lean over or bend laterally in a direction opposite to the direction of the skid, the greatest rib movement being at the tread surface where the ribs are separated by the relatively narrow slots 19. Hence, under severe lateral skid conditions, the faces 21 of the units 25 of one rib will engage the opposed faces 21 of the next adjacent rib and be buttressed thereby. At the same time, the laminations 23 are laterally displaced to move the exposed end faces of the laminations out of planar alignment thereby producing a corrugated or roughened surface on the exposed faces of the ribs 14. This materially enhances the skid resistance properties of the tire.

Figure 7:
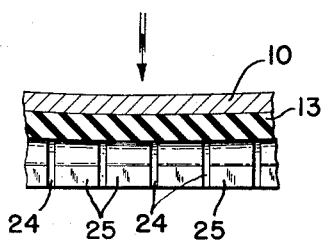
Fig. 7 is a fragmentary circumferential sectional view taken on line 7—7 in Fig. 2.
Figure 8:
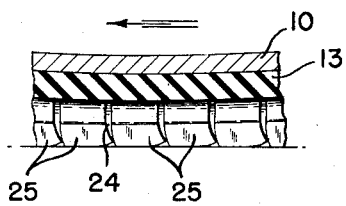
Fig. 8 is a view similar to Fig. 7 showing the tire tread as it appears when the brake is applied.

By a comparison of Figs. 7 and 8 the action of the tread, when the wheel brake is applied, can be observed. As shown in Fig. 7, the units 25 are, under normal conditions, circumferentially separated by the cross slots 24. However, if the wheel is traveling in the direction of the arrow in Fig. 8, and the brake is applied, the units 25 will be distorted out of their normal spaced relation into substantially the angular positions illustrated in Fig. 8 wherein the leading edge portions of each unit 25 will be presented for positive anti-skid engagement with the road surface. While the wheel is being power driven the trailing edge portions of each unit 25 will function in a like manner.

Tires having treads constructed in accordance with this invention have softer riding qualities, low noise volume, superior skid resistance and high traction properties. The undercut ribs provide tread grooves having wide bases and narrow face openings which minimize groove cracking and inhibit stone pick-up. This construction also provides a greater road contact area resulting in longer tread wear.

The flexible undercut ribs combine functionally with the cross slots to render these slots more effective in minimizing forward skid motion and with the circumferential slits to make these slits more free-acting in inhibiting lateral skids. Also, with this tread design the over-all stability of the tire is maintained because of the buttressing action of the ribs. This permits the use of anti-skid elements of greater height with the corresponding increase in tread wear. The cross slots will continue to be effective until the tread is substantially worn away and if the circumferential slits are renewed the tread will remain highly flexible and skid resistant to the end of its anti-skid life.

Having thus described our invention, what we claim and desire to protect by Letters Patent is:

1. A tire having a tread comprising a plurality of circumferentially extending ribs defining grooves therebetween, some of said ribs being undercut on both sides throughout their length to provide overhanging marginal portions at the road-engaging surface of the ribs which extend into the grooves in contiguous relation to the marginal portions of adjacent ribs, said ribs being relatively laterally flexible and said marginal portions adapted to contact each other under unusual loads or severe lateral stress, the road-engaging surface of said ribs between said overhanging portions being slit circumferentially to form a plurality of relatively thin laminations to impart surface flexibility and additional lateral flexibility to said ribs, and relatively narrow, circumferentially arranged, closely spaced slots extending transversely through said overhanging portions to a point adjacent said slitted area to divide the same into units functioning separately under tangential stress.

2. A tire tread comprising a plurality of circumferentially extending ribs defining grooves therebetween, some of said ribs being undercut on both sides throughout their length to impart lateral flexibility thereto and to form substantially continuous overhanging edge portions forming grooves between adjacent ribs having relatively wide bases and narrow face openings, said edge portions of adjacent ribs abutting when under lateral stress to buttress one another, the road-engaging surfaces of said ribs being slit circumferentially in the area between said overhanging portions to form a plurality of relatively thin laminations to impart surface flexibility to said ribs, and relatively narrow, circumferentially arranged, closely spaced cross slots in said overhanging portions defining units of relatively small base length functioning separately under tangential stress.

References Cited in the file of this patent

UNITED STATES PATENTS

| Number | Name | Date |
|---|---|---|
| D. 112,346 | Mooradian | Nov. 29, 1938 |
| 2,094,636 | Bull | Oct. 5, 1937 |
| 2,272,879 | Hargraves | Feb. 10, 1942 |
| 2,322,505 | Bull | June 22, 1943 |